United States Patent Office 3,144,479
Patented Aug. 11, 1964

3,144,479
NEW IODINE-CONTAINING BENZOIC
ACID ESTERS
Werner Herrmann Obendorf, Linz, Austria, assignor to Osterreichische Stickstoffwerke Aktiengesellschaft, Linz, Austria
No Drawing. Filed June 29, 1959, Ser. No. 823,317
Claims priority, application Austria Aug. 7, 1958
7 Claims. (Cl. 260—471)

This invention relates to new iodine-containing benzoic acid esters, particularly to new and valuable 3-amino-2,4,6-triiodobenzoic acid esters and 2,3,4,6-tetraiodobenzoyl acid esters which are valuable X-ray contrast agents, particularly X-ray contrast agents for cholecystography, for oral administration.

Another object of the invention is to provide a new, simple, and advantageous method of producing such iodated benzoic acid esters.

Further objects and valuable features of the invention will become apparent from the following specification.

The new iodine-containing benzoic acid esters correspond basically to the general formula

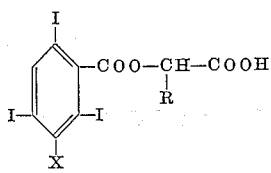

wherein X is a representative selected from the class consisting of the iodine atom and the amino group and R is a representative selected from the class consisting of the hydrogen atom, the alkyl radicals having 1–6 carbon atoms, the alkoxyalkyl radicals having 2–6 carbon atoms, the phenyl radical and the group

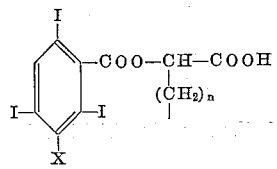

wherein $n$ is an integer fro 1–6 and X has the meaning defined above.

It has been found that after intravenous or oral administration these new iodated benzoic acid esters enrich in the gall-bladder to such a degree that they are eminently suitable for the X-ray diagnosis of the gall-organs. For this purpose the compounds according to the present invention may be taken orally either as free acids or in the form of the non-toxic salts. The non-toxic salts include, above all, those with inorganic bases, such as the sodium and lithium salts, or those with organic bases, such as the diethanolamine and methylglucosamine salts. The free acids as well as the non-toxic salts can be processed together with binders such as starch, talc, polyethylene glycol, magnesium stearate, or starch and lactose, to form tablets. The same mixtures may also be used to make cores for dragées. The iodated benzoic acid esters according to the present invention may also be filled into gelatine capsules, including sealed ones, and may be taken in this form. For this purpose either the pure substance is used or the mixture of the pure substance with an oil which does not deteriorate the gelatine.

The iodated benzoic acid esters according to the present invention can also form stable, clear solutions suitable for injection.

To produce the compounds according to the invention having the above-mentioned formula the salts of iodated benzoic acids having the formula

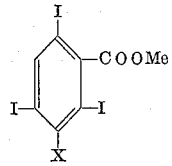

wherein Me is a metal selected from the class consisting of sodium and potassium and X has the meaning defined above are reacted with compounds having the general formula

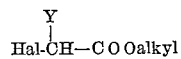

wherein Hal means halogen and Y is a representative of the class consisting of the hydrogen atom, the alkyl radicals having 1–6 carbon atoms, the alkoxyalkyl radicals having 1–6 carbon atoms, the phenyl radical and the group

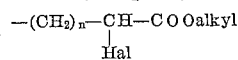

wherein $n$ is an integer from 1–6 and Hal means halogen.

The ester groups which are present in the reaction product and have originated from the halogencarboxylic acid derivative are subsequently transformed into the free acids by a treatment with saponifying agents. Where alcoholic alkali metal hydroxides are used for this purpose the alkali metal salts of the compounds according to the invention are formed as intermediate products, which can either be separated as such or be transformed to the free acids by the action of mineral acids. The free acids can also be transformed into the alkali metal salts by means of alkaline alkali metal compounds, of course.

In connection with this saponifying reaction it is remarkable that only ester groups which have originated from the halogencarboxylic acid derivative are saponified whereas the triiodoamino- or tetraiodobenzoic acid ester grouping is not attacked. This proves the high stability of the iodated benzoic acid esters according to the invention.

Where dihalogen-alkanedicarboxylic acids are used for the reaction with the alkali salts of the iodated benzoic acids, both halogen atoms react with elimination of alkali halide and the bis-3-amino-2,4,6-triiodobenzoyl- or bis-2,3,4,6-tetraiodobenzoyl esters of alkanedicarboxylic acids are formed according to the invention.

To perform the reaction between salts of the iodated benzoic acids and the halogencarboxylic acid derivatives the two reactants are suitably dissolved in an organic solvent, such as monohydric aliphatic alcohols or glycol alkyl ether, and are boiled several hours with refluxing.

The following examples serve to illustrate the present invention but do not restrict the same.

*Example 1*

100 grams 3-amino-2,4,6-triiodobenzoic acid sodium salts are dissolved in the cold in 100 milliliters methanol; 44 grams methyl alpha-bromobutyrate (125% of theory) are added and the mixture is heated at a bath temperature of about 90° C. for three days with refluxing. Upon cooling the reaction liquid congeals to form a solid mass. For isolating, the methanol is vacuum-stripped, the residue is dissolved in ether and the solution is washed with 10% KHCO₃ solution. After thorough shaking the ether solution dried with common salt gives a dry residue of 109.8 grams, which can be caused to crystallize by seeding and grinding with some methanol. After sucking and drying in a vacuum at 50–60° C., 96.7 grams methyl alpha-(3-amino-2,4,6-triiodobenzoyloxy)-butyrate, melting point 72–73° C., are obtained. (An additional amount of about 6.5 grams, melting point 69° C., is recovered by concentrating the mother liquor.) 76.7 grams of the ester are dissolved within 15 minutes by heating in 60 milliliters methanol and 90 milliliters water and 32.5 milliliters 4N NaOH with stirring. After heating for further 20 minutes without cooling the clear solution is diluted to about 900 milliliters, filtered with carbon and quickly added in drops into a solution of 50 milliliters 4N HCL in 1000 milliliters water. Nodules are formed, from which the mother liquor is decanted and replaced by water. Crystallization occurs upon storing over night. 67 grams alpha-(3-amino-2,4,6-triiodobenzoyloxy)-butyric acid, which is 75.4% of theory.

The sodium salt is obtained therefrom by dissolving in methanolic NaOH and precipitating with ether.

*Analysis.*—Sodium salt: $C_{11}H_{11}O_5NI_3Na.H_2O$—Caculated: N, 2.19; Na, 3.56. Found: N, 2.18; Na, 3.60. Acid.—Calculated: N, 2.33. Found: N, 2.31.

In analogous manner the reaction of 3-amino-2,4,6-triiodobenzoic acid sodium salt with (*a*) Methyl alphabromovaleric acid, with boiling for 20 hours, gives the oily alpha-(3-amino-2,4,6-triiodobenzoyloxy)-n-valeric acid. Yield of sodium salt 73.3% of theory.

*Analysis.*—Calculated: N. 2.20; I, 59.77. Found: N, 2.17; I, 59.15.

(*b*) Methyl alpha-bromo-n-caproate, with boiling for 20 hours, gives alpha-(3-amino-2,4,6-triidobenzoyloxy)-n-caproic acid, having a melting point at 119–122° C. Yield of sodium salt, 70% of theory.

*Analysis.*—Calculated: N, 2.15. Found: N, 2.14.

(*c*) Butyl alpha-bromopropionate, with boiling for 60 hours, gives alpha-(3-amino-2,4,6-triiodobenzoyloxy)-propionic acid.

*Analysis of the sodium salt.*—Calculated: N, 2.23; I, 60.72. Found: N, 2.15; I, 61.02.

(*d*) Ethyl alpha-bromphenylacetate-(dl), with boiling for 48 hours, gives (3-amino-2,4,6-triiodobenzoyloxy)-alphaphenylacetic acid having a melting point at 95° C. Yield, 80.3% of theory.

Example 2

53.7 grams sodium 3-amino-2,4,6-triiodobenzoate and 20 grams methyl alpha-bromo-beta-methoxypropionate are dissolved in 100 milliliters methanol and heated in a bath at 90° C. for 72 hours with refluxing. The reaction solution is then poured into 500 milliliters water and shaken with ether. The ether solution is washed with $KHCO_3$ solution and water and after drying the ether solution the residue from vacuum evaporation prepared is heated with n-hexane under reflux. The hexane is renewed several times. After removal of the hexane, 32.5 grams methyl alpha-(3-aminotriiodobenzoyloxy)-beta-methoxypropionate remain, having a melting point at 79–83.5° C. When saponification is effected in analogy to the foregoing examples with methanolic NaOH but at room temperature the sodium salt is obtained in the form of a hygroscopic white powder.

*Analysis.*—Methyl ester, $C_{12}H_{12}O_5NI_3$: Mole weight, 630.87. Calculated: C, 22.84; H, 1.92; N, 2.22. Found: C, 22.95; H, 2.00; N, 2.16.

Example 3

53.7 grams sodium 3-amino-2,4,6-triiodobenzoate are dissolved together with 18.0 grams high-melting diethyl alpha-alpha'-dibromoadipate in 50 milliliters glycol monoethyl ether and are heated to an internal temperature of about 80° C. for thirty hours. The evaporation residue of the reaction mixture is heated with ethyl acetate and the insoluble fraction is recrystallized out of glycol monoethyl ether after boiling with water. The first and second crystallizates total 20.8 grams of analytically pure diethyl alpha,alpha'-bis-(3 - amino-2,4,6-triiodobenzoyloxy)- adipate of the high-melting form, melting form 193–195.5° C.

*Analysis.*—$C_{24}H_{22}O_8N_2I_6$: Mole weight, 1227.992. Calculated: N, 2.28; I, 62.01. Found: N, 2.28; I, 62.57.

This product is saponified by dissolving in glycol monoethyl ether, adding a small surplus of NaOH at elevated temperature and boiling the solution until a sample of the solution remains clear upon addition of water. After vacuum-stripping the solvent the residue is dissolved in water and filtered with carbon and the acid is precipitated by adding HCl until the reaction becomes strongly acid. The pure acid can be obtained by dissolving in acetone, in which it is very easily soluble, filtering, and evaporating the acetone. Melting point 138–148° C.

The ethyl acetate solution obtained according to the first paragraph of this example is washed with $KHCO_3$ solution and water. The ethyl acetate is subsequently vacuum-stripped and the evaporation residue is caused to crystallize with ether. This gives 17 grams of the low-melting form of diethyl alpha,alpha'-bis-(3-amino-2,4,6-triiodobenzoyloxy)adipate, melting point 133–139° C.

*Analysis.*—Calculated: N, 2.28. Found: N, 2.27.

The saponification of the low-melting ester in analogy to the teaching given for the higher-melting ester gives the free alph,alpha'-bis-(3 - amino-2,4,6-triiodobenzoyloxy)-adipic acid, melting point 95–100° C.

Example 4

67 grams 3-amino-2,4,6-triiodobenzoic acid are dissolved in about 300 milliliters concentrated sulfuric acid at elevated temperature and cooled to 0° C. This solution has added thereto at 0–5° C. a solution of 12 grams $MnNO_2$ in 100 milliliters concentrated sulfuric acid with stirring within about ten minutes. Then about 200 milliliters 85% phosphoric acid are added with stirring and good cooling to prevent the temperature from rising above 10° C. After the addition has been completed the ice bath is removed and the reaction mixture is stored for one hour. Flowing the reaction mixture into 2 liters ice-water-mixture gives a clear, yellow solution of the diazonium salt, which solution is freed from surplus nitrite by an addition of 12 grams urea. A gradual addition of a solution of 30 grams KI gives immediately a deep red precipitate; which gradually assumes a yellow-brown color while developing nitrogen. Heating to about 60° C. terminates the reaction, whereafter the crude product is suction-filtered and dissolved in 1N NaOH, whereafter Na-sulfite is added and almost colorless tetraiodobenzoic acid is precipitated with mineral acid. Yield of crude product 73 grams.

The acid can be recrystallized out of methanol. It does not show a uniform melting behavior. Sublimation occurs at 200° C. Two different melting points can be observed at 259° C. and at 298–299° C. The acid is believed to have two modifications, the sublimate being associated with the low-melting form.

62.57 grams 2,3,4,6-tetraiodobenzoic acid are dissolved in 700 milliliters ether and the sodium salt is precipitated by an addition of 33.8 milliliters 2.96 N methanolic NaOH, which has been somewhat diluted with ether. After suction filtering and drying the salt, 63.4 grams tetraiodobenzoic acid sodium salt are obtained, which is 97.88% of theory.

13.0 grams 2,3,4,6-tetraiodobenzoic acid sodium salt are dissolved in 13.0 grams methanol and 3.7 grams methyl alpha-bromobutyrate are added. The reaction mixture is then heated to 95° C. for about 60 hours. After cooling the reaction mixture is processed by an addition of ether and $KHCO_3$ solution whereafter the ether layer is separated, dried by shaking with common salt solution, and evaporated to dryness. 13.12 grams methyl 2,3,4,6-tetraiodobenzoyloxybutyrate are obtained, which is 90% of theory.

The ester can be saponified by the action of 6.3 milliliters 2.96 N methanolic NaOH. The Na salt crystallizes in the cold and is completely precipitated by an addition of ether.

11.8 grams 2,3,4,6-tetraiodobenzoyloxybutyric acid sodium salt are obtained. Total yield of sodium salt, 80.16% of theory.

*Analysis.*—Calculated: Na, 3.13. Found: Na, 3.13.

In analogous manner the reaction of 2,3,4,6-tetraiodobenzoic acid sodium salt with (*a*) Methyl alpha-bromopropionate, with boiling for 84 hours, gives alpha-(2,3,4,6-tetraiodobenzoyloxy)-propionic acid.

Yield of sodium salt, 77.98%.

*Analysis.*—Calculated: I, 70.51; Na. 3.19. Found: I, 67.7; Na, 3.24.

(*b*) Methyl alpha-bromovaleric acid, with boiling for 92 hours, gives alpha-(2,3,4,6-tetraiodobenzoyloxy)-valeric acid.

Yield of sodium salt, 48.5% of theory.

*Analysis.*—Calculated: C, 19.27; Na, 3.07; H, 1.21. Found: C, 19.6; Na, 3.4; H, 1.4.

Example 5

15 grams 2,3,4,6-tetraiodobenzoic acid sodium salt and 4.18 grams diethyl alpha,alpha'-dibromoadipate are heated in 15 milliliters glycol monoethyl ether to 115–120° C. for 96 hours. After the reaction has been terminated the resulting solid precipitate is suction-filtered, boiled with about 150 milliliters water and dried at 100° C. 1405 grams diethyl alpha,alpha'-bis-(2,3,4,6-tetraiodobenzoyloxy)-adipate are obtained having a melting point (Kofler-Heizbank) of 180–190° C. No separation was made of any diastereo isomers.

For saponification, 13.8 grams of this ester were suspended in 50 milliliters glycol monoethyl ether and heated to the boil. 7 milliliters 3 N methanolic sodium hydroxide solution are introduced into the boiling mixture and the heating is continued until a sample gives a clear solution in water. The disodium salt precipitated upon cooling is separated and the still dissolved amounts of the disodium salt are precipitated by adding acetone and ether to the mother liquor.

A total of 13.15 grams of the disodium salt of alpha,alpha-bis-(2,3,4,6-tetraiodobenzoyloxy)-adipic acid are obtained, which corresponds to a total yield of 79.02% of theory.

*Analysis of the sodium salt.*—$C_{20}H_8O_8I_8Na_2 + 2CH_3OH$. Calculated: C, 17.6; H, 1.07; I, 67.61; Na, 3.06. Found: C, 17.7; H, 0.85; I, 67.9; Na, 3.07.

Example 6

31.4 grams 3-amino-2,4,6-triiodobenzoic acid potassium salt are dissolved in 25 milliliters methanol and have 12.3 grams ethyl monoiodoacetate added thereto. After boiling for 24 hours under reflux the methanol is vacuum-stripped, the residue is received in ample ether and dilute $KHCO_3$ solution and the resulting two layers are separated. The ether solution is dried and then evaporated. 29.6 grams ethyl 3-amino-2,4,6-triiodobenzoyloxyacetate are obtained, which is 87.38% of theory.

The ester can be transformed into the sodium salt by a treatment with methanol and methanolic sodium hydroxide solution. Dissolving in water and adding a surplus of hydrochloric acid gives 25.2 grams 3-amino-2,4,6-triiodobenzoyloxy-acetic acid having a melting point at 172-176° C. Overall yield, 77.4%.

The iodated benzoic acid esters according to the present invention as have been described in the foregoing examples are X-ray contrast agents preferably for oral administration and are used with success to show the gall-bladder.

In clinical examinations carried out, e.g., with alpha-(3-amino-2,4,6-triiodobenzoyloxy)-butyric acid and its sodium salt it has been found that a shade of the gall-bladder becomes often visible as soon as about 1½ hours after an oral dosage of 2–3 grams. The administration is suitably effected, however, on the eve of the examination. In the few cases in which it has not been possible so far to show the gall-bladder with the above-mentioned compounds the operation showed always pathological changes of this organ. It is remarkable that secondary effects such as vomiting or diarrhoea have not been observed so far.

The following examples are given for the composition of the X-ray contrast agents according to the invention:

Example 7

700 milligrams alpha-(3-amino-2,4,6-triiodobenzoyloxy)-butyric acid sodium salt
163 milligrams amylum solani
2 milligrams lauryl alcohol sulfonate
30 milligrams talcum venetum
5 milligrams magnesium stearate give 800 milligrams of a composition, which is molded to form a tablet. A tablet core of the same composition, having a weight of 350 milligrams, can be coated with the following composition to form a dragée:

240 milligrams saccherum album
6 milligrams gelatine
3.6 milligrams polyethyleneglycol
0.3 milligram coloring matter.

In analogous manner the sodium salts of Examples 1*a–c*, 2, 4 and 4*a, b* can be processed to form tablets and dragées.

Example 8

600 milligrams alpha-(3-amino-2,4,6-triiodobenzoyloxy)-butyric acid
165 milligrams amylum solani
28 milligrams talcum venetum
7 milligrams magnesium stearate give 800 milligrams of a composition, which is molded to form a tablet. A tablet core of the same composition, having a weight of 350 milligrams, can be coated with the following composition to form a dragée:

117 milligrams saccherum album
33 milligrams talcum venetum
100 milligrams polyethyleneglycol In analogous manner the acids of Examples 1*a–c*, 2, 3 and 4*a, b* can be processed to form tablets and dragées.

I claim:

1. An iodine-containing benzoic acid ester compound selected from the group consisting of compounds having the formula

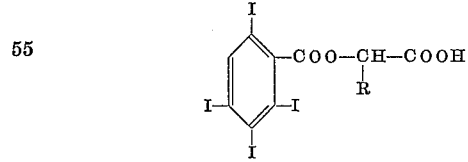

wherein R is selected from the group consisting of hydrogen, alkyl having 1–6 carbon atoms, alkoxy alkyl having 2–6 carbon atoms, phenyl and the group

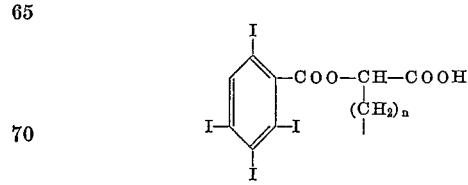

wherein *n* is an integer from 1–6, and the non-toxic salts thereof.

2. A compound having the formula

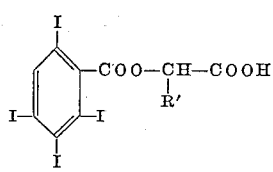

wherein R′ is alkyl having 1–4 carbon atoms.

3. A compound having the formula

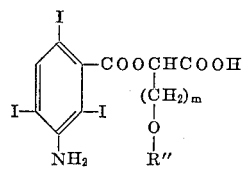

wherein R′ is alkyl having 1–3 carbon atoms and $m$ is one of the integers 1 and 2.

4. A compound having the formula

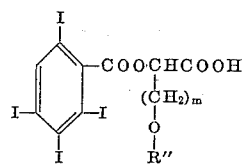

wherein R″ is alkyl having 1–3 carbon atoms and $m$ is one of the integers 1 and 2.

5. Alpha-(2,3,4,6-tetraiodobenzoyloxy)-isovaleric acid.
6. Alpha-(2,3,4,6-tetraiodobenzoyloxy)butyric acid.
7. Sodium alpha-(3-amino-2,4,6-triiodobenzoyloxy)-β-methoxy-propionate.

References Cited in the file of this patent

UNITED STATES PATENTS

| | | |
|---|---|---|
| 2,680,133 | Wallingford | June 1, 1954 |
| 2,767,210 | Morren | Oct. 16, 1956 |
| 2,790,748 | Papa et al. | Apr. 30, 1957 |
| 2,847,456 | Hurd | Aug. 12, 1958 |
| 3,097,228 | Larsen | July 9, 1963 |